(12) United States Patent
Peng et al.

(10) Patent No.: US 9,651,818 B2
(45) Date of Patent: May 16, 2017

(54) LIQUID CRYSTAL DISPLAY PANEL COMPRISING DIFFERENT SPACING DISTANCES BETWEEN PIXEL ELECTRODES CORRESPONDING TO SPECIFIC COLOR RESIST BLOCKS

(71) Applicant: Wuhan China Star Optoelectronics Technology Co., Ltd., Wuhan (CN)

(72) Inventors: Haibo Peng, Wuhan (CN); Dejiun Li, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 2 days.

(21) Appl. No.: 15/008,424

(22) Filed: Jan. 27, 2016

(65) Prior Publication Data

US 2017/0102581 A1 Apr. 13, 2017

(30) Foreign Application Priority Data

Oct. 13, 2015 (CN) .......................... 2015 1 0659225

(51) Int. Cl.
*G02F 1/1368* (2006.01)
*G02F 1/1343* (2006.01)
*G02F 1/1335* (2006.01)

(52) U.S. Cl.
CPC ...... *G02F 1/133514* (2013.01); *G02F 1/1368* (2013.01); *G02F 1/13439* (2013.01); *G02F 1/133512* (2013.01); *G02F 1/134309* (2013.01)

(58) Field of Classification Search
CPC ....................... G02F 1/134309; G02F 1/13439
See application file for complete search history.

(56) References Cited

U.S. PATENT DOCUMENTS

2004/0125277 A1* 7/2004 Kim ................ G02F 1/136209
349/106
2006/0146267 A1* 7/2006 Choi ................ G02F 1/133377
349/156

(Continued)

*Primary Examiner* — Paul Lee
(74) *Attorney, Agent, or Firm* — Leong C. Lei

(57) ABSTRACT

The present invention provides a liquid crystal display panel, in which the spacing distance of the pixel electrodes that correspond to the green resist blocks from the pixel electrodes corresponding to red and blue resist blocks adjacent thereto is made greater than the spacing distance between the pixel electrodes corresponding to the red resist blocks and the pixel electrodes corresponding to the blue resist blocks, this being equivalent to expanding the distance between a green sub-pixel of the liquid crystal display panel and a blue sub-pixel and a red sub-pixel adjacent thereto, thereby reducing the possibility of the background light corresponding to the red and blue sub-pixels being diffused into the green sub-pixel and reducing the amount of green light mixed with peripheral portions of red and blue images and thus improving the issue of large view angle color shifting of the liquid crystal display panel; and also, cell thickness of the liquid crystal display panel corresponding to the green resist blocks is reduced so as to further reduce the amount of the background light corresponding to the red and blue sub-pixels being diffused into the green sub-pixel and reduce the amount of green light mixed with the peripheral portions of the red and blue images and thus improving the problem of large view angel color shifting of the liquid crystal display panel and enhancing quality of displaying.

10 Claims, 4 Drawing Sheets

(56) References Cited

U.S. PATENT DOCUMENTS

| | | | |
|---|---|---|---|
| 2007/0008242 A1* | 1/2007 | Mori | G02F 1/134309 345/60 |
| 2011/0069258 A1* | 3/2011 | Joo | G02B 5/201 349/106 |
| 2011/0273637 A1* | 11/2011 | Utsumi | G02F 1/13363 349/23 |
| 2013/0016297 A1* | 1/2013 | Nakamura | G02F 1/133707 349/46 |
| 2013/0215345 A1* | 8/2013 | Kaneko | G02F 1/134309 349/41 |

* cited by examiner (a)

(b)

(c)

(a)

| Color | Red | Green | Blue |
|---|---|---|---|
| Photoresist Thickness | 2.1 | 2.1 | 2.1 |
| Transmission (%) | 18.24 | 52.17 | 8.88 |

(b)

LIQUID CRYSTAL DISPLAY PANEL COMPRISING DIFFERENT SPACING DISTANCES BETWEEN PIXEL ELECTRODES CORRESPONDING TO SPECIFIC COLOR RESIST BLOCKS

BACKGROUND OF THE INVENTION

1. Field of the Invention

The present invention relates to the field of display technology, and in particular to a liquid crystal display panel.

2. The Related Arts

Liquid crystal displays (LCDs) have a variety of advantages, such as thin device body, low power consumption, and being free of radiation, and are thus used widely, such as liquid crystal televisions, mobile phones, personal digital assistants (PDAs), digital cameras, computer screens, or notebook computer screens, and take a leading position in the field of tablet computers.

A liquid crystal display panel is generally composed of a color filter (CF) substrate, a thin-film transistor (TFT) array substrate, and a liquid crystal interposed between the CF substrate and the TFT substrate. The operation principle of the liquid crystal display panel is that a driving voltage is applied to two glass substrates to control the rotation of the liquid crystal molecules contained in the liquid crystal layer in order to refract out light from the backlight module for displaying an image.

With the development of the liquid crystal display technology, the resolution of the liquid crystal panel is increasingly improved and the size of sub-pixels is getting smaller and smaller. As shown in FIGS. 1a, 1b, and 1c, which respectively illustrate curves of color shifting of red (R), green (G), and blue (B) sub-pixels with respect to variation of view angle, it is clear from comparison of the three drawings that in a large view angle, the color shifting of the red sub-pixel is worst, that of the blue sub-pixel is less, and that of the green sub-pixel is the least.

FIG. 2a illustrates transmission spectra of red, green, and blue light, wherein Y1, Y2, and Y3 respectively represent transmission rates of red, green, and blue light with respect to the variation of wavelength, and Y4 represents a curve indicating human eyes perceiving stimulation of brightness. It is obvious that the transmission wave band of green light mostly coincides with the perception curve of brightness stimulation. In other words, human eyes are most sensitive to the green light wave band. FIG. 2b lists measurements of transmission of red, green, and blue light through a normal photoresist film thickness of 2.1 μm, where the transmission of green light is the highest and is 52.17%; that of red light is the next highest and is 18.24%; and that of blue light is the lowest and is 8.88%.

When an observer observes an image displayed on a display device, as shown in FIG. 3, if the observation is made inclined at the left-hand side, then a fraction of light travels inclinedly from the array substrate side of the green sub-pixel zone G and passes through the blue sub-pixel zone B to get incident onto human eyes, so that the observer would see a green image partly mixed with blue light and large view angle color shifting results. For the same reason, for inclined view of observation from the left-hand side, it is possible that the observer would see a red image mixed with green color, a green image mixed with blue color, and a blue image mixed with red color; and for inclined view of observation from the right-hand side, it is possible that the observer would see a red image mixed with blue color, a green image mixed with red color, and a blue image mixed with green color. This, when taken into consideration together with the analysis provided with FIG. 2a, indicates in large view angle color shifting, the extent of color shifting would be severest for rod images, that of the blue images is less severe, and that of the green images is the least severe.

SUMMARY OF THE INVENTION

An object of the present invention is to provide a liquid crystal display panel, which helps alleviate large view angle color shifting and improves displaying quality of the panel.

To achieve the above object, the present invention provides a liquid crystal display panel, which comprises: a color filter substrate and an array substrate that are arranged opposite to each other and a liquid crystal layer interposed between the color filter substrate and the array substrate;

the color filter substrate comprising a first backing plate and a color resist layer and a black matrix arranged on the first backing plate, the color resist layer comprising a plurality of color resist blocks that is arranged in an array, wherein the plurality of color resist blocks comprises red resist blocks, green resist blocks, and blue resist blocks, the black matrix comprising a plurality of black light-shielding strips respectively located in spacing zones between the plurality of color resist blocks;

the array substrate comprises a second backing plate, a thin-film transistor (TFT) layer arranged on the second backing plate, and a pixel electrode layer arranged on the TFT layer, the pixel electrode layer comprising a plurality of pixel electrodes corresponding respectively to the plurality of color resist blocks, the plurality of pixel electrodes comprising first pixel electrodes corresponding to the red resist blocks, second pixel electrodes corresponding to the green resist blocks, and third pixel electrodes corresponding to the blue resist blocks;

wherein a spacing distance between the second pixel electrodes that correspond to the green resist blocks and the first pixel electrodes that correspond to the red resist blocks and a spacing distance between the second pixel electrodes that correspond to the green resist blocks and the third pixel electrodes that correspond to the blue resist blocks are both greater than a spacing distance between the first pixel electrodes that correspond to the red resist blocks and the third pixel electrodes that correspond to the blue resist blocks.

The spacing distance between the second pixel electrodes that correspond to the green resist blocks and the first pixel electrodes that correspond to the red resist blocks and the spacing distance between the second pixel electrodes that correspond to the green resist blocks and the third pixel electrodes that correspond to the blue resist blocks are both 12 μm; and the spacing distance between the first pixel electrodes that correspond to the red resist blocks and the third pixel electrodes that correspond to the blue resist blocks is 10 μm.

The plurality of black light-shielding strips that forms the black matrix has identical widths.

The widths of the black light-shielding strips are 5 μm.

The color filter substrate further comprises a covering layer arranged on the color resist layer and the black matrix.

A gap distance between a site of the color filter substrate where the red resist blocks are arranged and the array substrate and a gap distance between a site of the color filter substrate where the blue resist blocks are arranged and the array substrate are both greater than a gap distance between a site of the color filter substrate where the green resist blocks are arranged and the array substrate.

The blue resist blocks and the red resist blocks have thicknesses that are less than a thickness of the green resist blocks and portions of the covering layer corresponding to the red resist blocks, the green resist blocks, and the blue resist blocks have thicknesses that are identical.

The red resist blocks, the green resist blocks, and the blue resist blocks have thicknesses that are identical and portions of the covering layer corresponding to the red resist blocks and the blue resist blocks have thicknesses that are less than a thickness of portions of the covering layer that correspond to the green resist blocks.

The gap distance between the site of the color filter substrate where the red resist blocks are arranged and the array substrate and the gap distance between the site of the color filter substrate where the blue resist blocks are arranged and the array substrate are both 3.2 µm, and the gap distance between the site of the color filter substrate where the green resist blocks are arranged and the array substrate is 3 µm.

The pixel electrode layer is formed of a material comprising indium tin oxide and metal lines are arranged in spacing zones between the first pixel electrodes, the second pixel electrodes, and the third pixel electrodes; a thickness of the metal lines arranged between the second pixel electrodes and the first pixel electrodes and a thickness of the metal line arranged between the second pixel electrodes and the third pixel electrodes are both greater than a thickness of the metal lines arranged between the first pixel electrodes and the third pixel electrodes.

The efficacy of the present invention is that the present invention provides a liquid crystal display panel, in which the spacing distance of the pixel electrodes that correspond to the green resist blocks from the pixel electrodes corresponding to red and blue resist blocks adjacent thereto is made greater than the spacing distance between the pixel electrodes corresponding to the red resist blocks and the pixel electrodes corresponding to the blue resist blocks, this being equivalent to expanding the distance between a green sub-pixel of the liquid crystal display panel and a blue sub-pixel and a red sub-pixel adjacent thereto, thereby reducing the possibility of the background light corresponding to the red and blue sub-pixels being diffused into the green sub-pixel and reducing the amount of green light mixed with peripheral portions of red and blue images and thus improving the issue of large view angle color shifting of the liquid crystal display panel; and also, cell thickness of the liquid crystal display panel corresponding to the green resist blocks is reduced so as to further reduce the amount of the background light corresponding to the red and blue sub-pixels being diffused into the green sub-pixel and reduce the amount of green light mixed with the peripheral portions of the red and blue images and thus improving the problem of large view angel color shifting of the liquid crystal display panel and enhancing quality of displaying.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will become apparent from the following detailed description of an embodiment of the present invention, with reference to the attached drawings.

In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
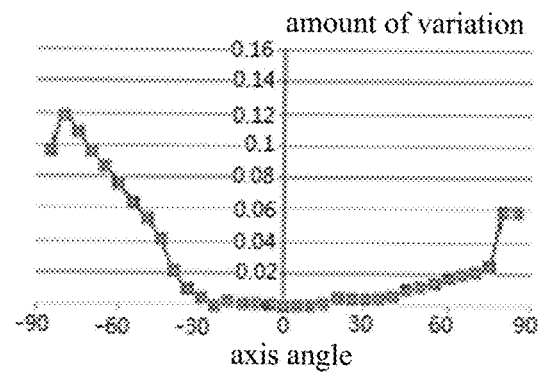
FIGS. 1a, 1b, and 1c show curves of color shifting of red, green, and blue sub-pixel with respect to the variation of view angle.
Figure 1:
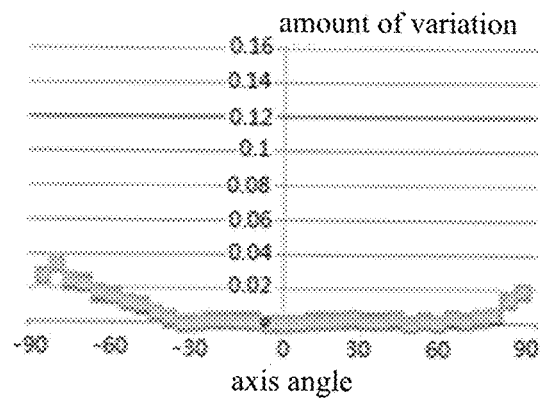
Figure 1:
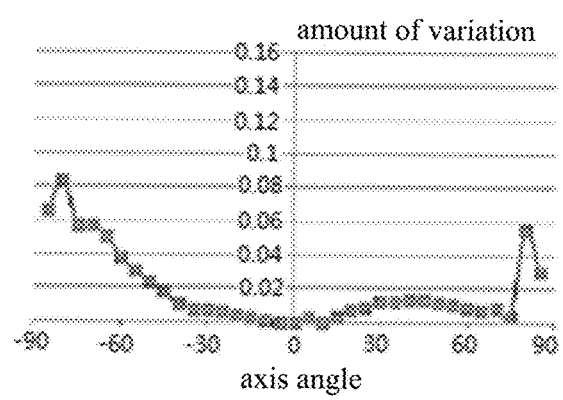
Figure 2:
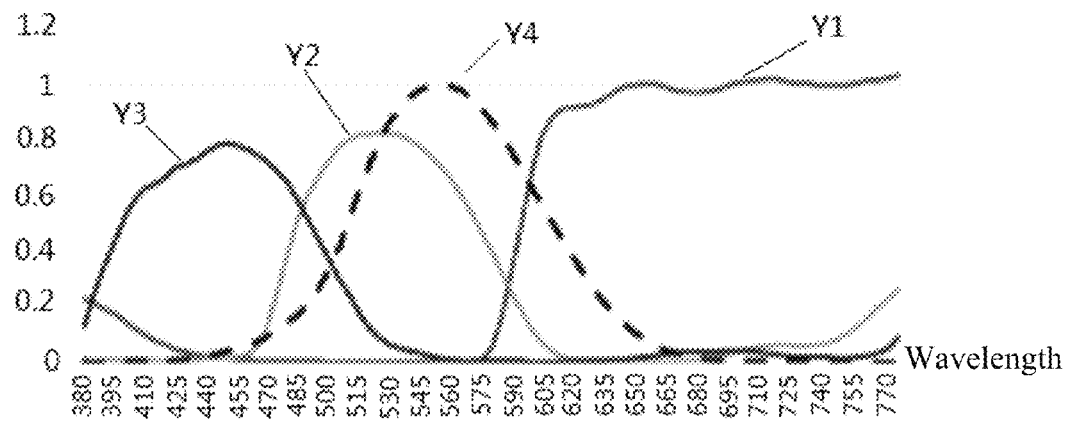
FIG. 2a shows transmission spectra of light of red, green, and blue colors.
FIG. 2b lists transmission rates of light of red, green, and blue colors with respect to a photoresist film thickness of 2.1 µm.
Figure 3:
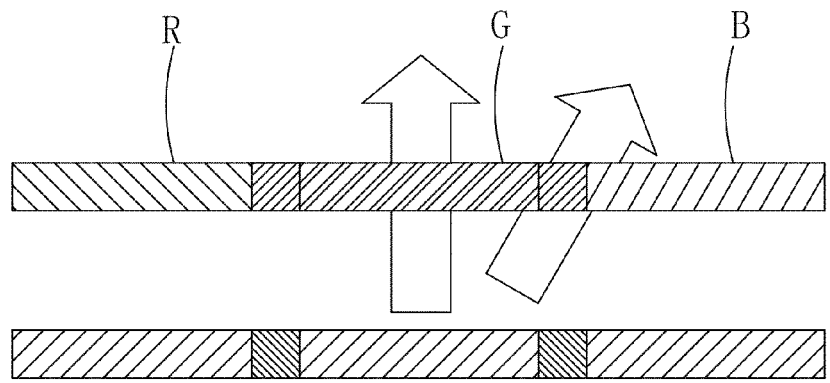
FIG. 3 is a schematic view illustrating the concept of color shifting when observation is made inclined at a left-hand side.
Figure 4:
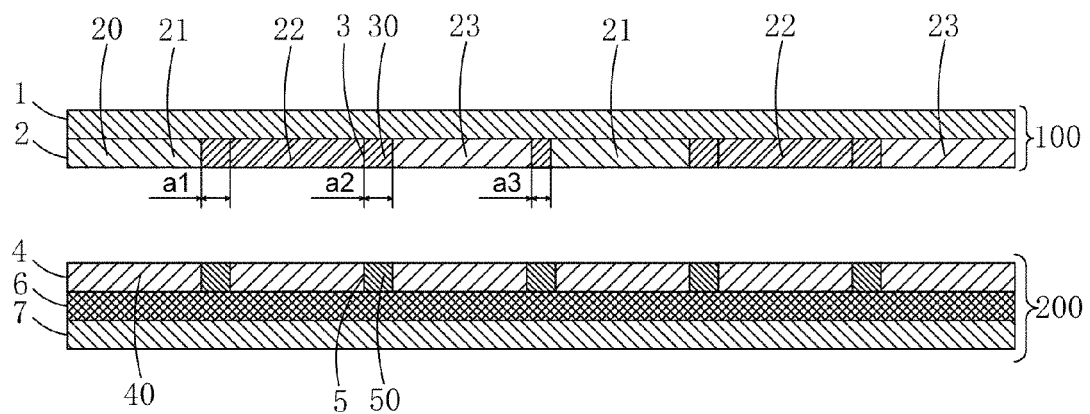
FIG. 4 is a schematic view illustrating a liquid crystal display panel according to a first embodiment of the present invention.

Referring to FIG. 4, a schematic view is given to illustrate a liquid crystal display panel according to a first embodiment of the present invention. The liquid crystal display panel according to the first embodiment comprises: a color filter substrate 100 and an array substrate 200 that are arranged opposite to each other and a liquid crystal layer (not shown) interposed between the color filter substrate 100 and the array substrate 200.

The color filter substrate 100 comprises a first backing plate 1 and a color resist layer 2 and a black matrix 3 arranged on the first backing plate 1. The color resist layer 2 comprises a plurality of color resist blocks 20 that is arranged in an array, wherein the plurality of color resist blocks 20 comprises red resist blocks 21, green resist blocks 22, and blue resist blocks 23. The black matrix 3 comprises a plurality of black light-shielding strips 30 respectively located in spacing zones between the plurality of color resist blocks 20.

The array substrate 200 comprises a second backing plate 7, a thin-film transistor (TFT) layer 6 arranged on the second backing plate 7, and a pixel electrode layer 4 arranged on the TFT layer 6. The pixel electrode layer 4 comprises a plurality of pixel electrodes 40 corresponding respectively to the plurality of color resist blocks 20. The plurality of pixel electrodes 40 comprises first pixel electrodes 41 corresponding to the red resist blocks 21, second pixel electrodes 42 corresponding to the green resist blocks 22, and third pixel electrodes 43 corresponding to the blue resist blocks 23.

A spacing distance b1 between the second pixel electrodes 42 that correspond to the green resist blocks 22 and the first pixel electrodes 41 that correspond to the red resist blocks 21 and a spacing distance b2 between the second pixel electrodes 42 that correspond to the green resist blocks 22 and the third pixel electrodes 43 that correspond to the blue resist blocks 23 are both greater than a spacing distance b3 between the first pixel electrodes 41 that correspond to the red resist blocks 21 and the third pixel electrodes 43 that correspond to the blue resist blocks 23.

Preferably, the spacing distance b1 between the second pixel electrodes 42 that correspond to the green resist blocks 22 and the first pixel electrodes 41 that correspond to the red resist blocks 21 and the spacing distance b2 between the second pixel electrodes 42 that correspond to the green resist blocks 22 and the third pixel electrodes 43 that correspond to the blue resist blocks 23 are both 12 µm; and the spacing distance b3 between the first pixel electrodes 41 that correspond to the red resist blocks 21 and the third pixel electrodes 43 that correspond to the blue resist blocks 23 is 10 µm.

Specifically, the plurality of black light-shielding strips 30 that form the black matrix 3 have identical widths. Preferably, the widths of the black light-shielding strips 30 are 5 µm.

Specifically, the pixel electrode layer 4 is made of a material comprising ITO (indium tin oxide).

Generally, the spacing zones between the first pixel electrodes 41 that correspond to the red resist blocks 21, the second pixel electrodes 42 that correspond to the green resist blocks 22, and the third pixel electrodes 43 that correspond to the blue resist blocks 23 are often provided with metal wiring (not labeled) that is not light transmitting, such as scan lines and data lines. In other words, in the present invention, the width of the metal lines arranged between the second pixel electrodes 42 that correspond to the green resist blocks 22 and the first pixel electrodes 41 that correspond to the red resist blocks 21 and the width of the metal lines arranged between the second pixel electrodes 42 that correspond to the green resist blocks 22 and the third pixel electrodes 43 that correspond to the blue resist blocks 23 are both greater than the width of the metal lines arranged between the first pixel electrodes 41 that correspond to the red resist blocks 21 and the third pixel electrodes 43 that correspond to the blue resist blocks 23.

In the liquid crystal display panel illustrated in FIG. 4, the spacing distance b3 between the first pixel electrodes 41 that correspond to the red resist blocks 21 and the third pixel electrodes 43 that correspond to the blue resist blocks 23 is made relatively small and the spacing distance b1 between the second pixel electrodes 42 that correspond to the green resist blocks 22 and the first pixel electrodes 41 that correspond to the red resist blocks 21 and the spacing distance b2 between the second pixel electrodes 42 that correspond to the green resist blocks 22 and the third pixel electrodes 43 that correspond to the blue resist blocks 23 are made relatively large and this is equivalent to expand the distance between a green sub-pixel of the liquid crystal display panel and a blue sub-pixel and a red sub-pixel adjacent thereto thereby reducing the possibility of background light that corresponds to red and blue sub-pixels being diffused into the green sub-pixel and reducing the amount of green light mixed with peripheral portions of red and blue images and thus improving the problem of large view angel color shifting of the liquid crystal display panel and enhancing quality of displaying.

Figure 5:
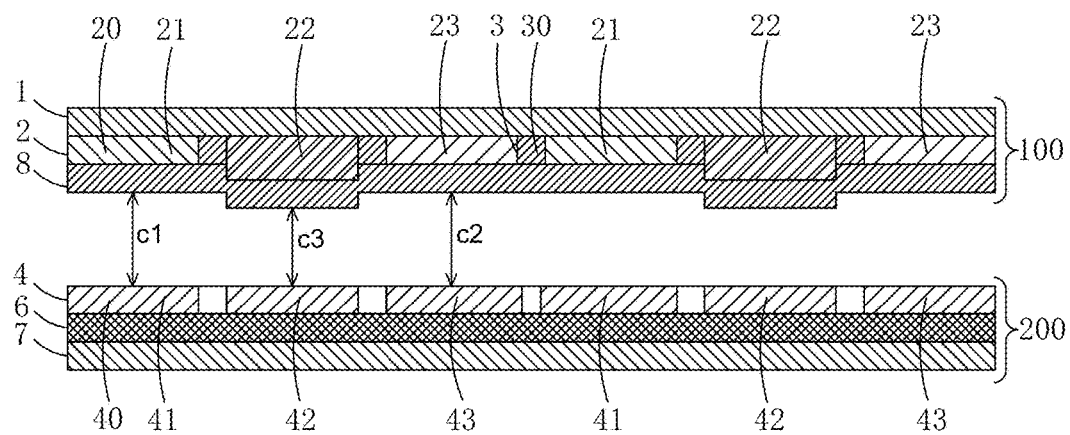
FIG. 5 is a schematic view illustrating a liquid crystal display panel according to a second embodiment of the present invention.
Figure 6:
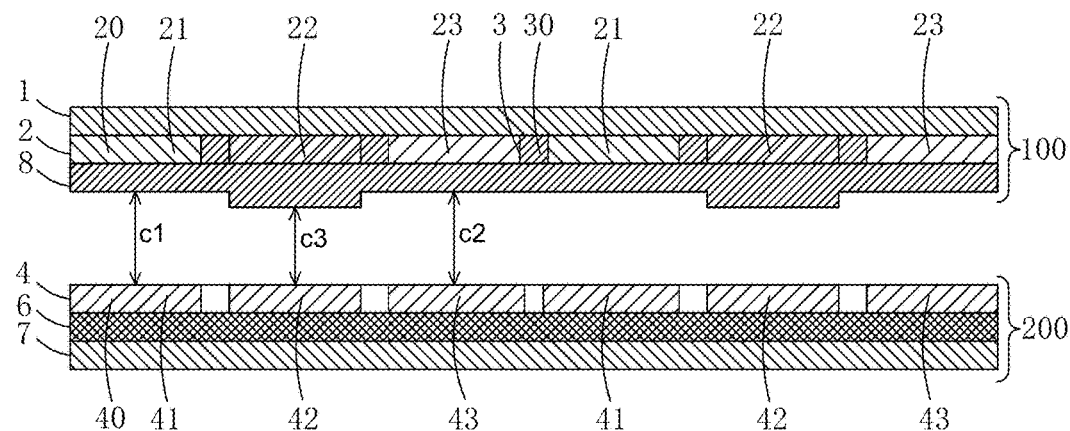
FIG. 6 is a schematic view illustrating a liquid crystal display panel according to a third embodiment of the present invention.

Further, referring to FIGS. 5 and 6, the present invention also provides a second embodiment and a third embodiment of the liquid crystal display panel. The second and third embodiments of the liquid crystal display panel differ from the first embodiment of the liquid crystal display panel in that the color filter substrate 100 further comprises a covering layer 8 arranged on the color resist layer 2 and the black matrix 3; and a gap distance c1 between a site of the color filter substrate 100 where the red resist blocks 21 is arranged and the array substrate 200 and a gap distance c2 between a site of the color filter substrate 100 where the blue resist blocks 23 is arranged and the array substrate 200 are both greater than a gap distance c3 between a site of the color filter substrate 100 where the green resist blocks 22 is arranged and the array substrate 200.

Specifically, the gap distances between different sites of the color filter substrate 100 that correspond to the resist blocks of different colors and the array substrate 200 can be provided with the following two ways:

Referring to FIG. 5, a schematic view is given to illustrate the liquid crystal display panel according to the second embodiment of the present invention. In the instant embodiment, the blue resist blocks 23 and the red resist blocks 21 are made such that thicknesses thereof are both smaller than a thickness of the green resist blocks 22 and portions of the covering layer 8 that correspond respectively to the red resist blocks 21, the green resist blocks 22, and the blue resist blocks 23 have identical thicknesses.

Referring to FIG. 6, a schematic view is given to illustrate the liquid crystal display panel according to the third embodiment of the present invention. In the instant embodiment, the red resist blocks 21, the green resist blocks 22, and the blue resist blocks 23 have identical thicknesses and portions of the covering layer 8 that correspond respectively to the red resist blocks 21 and the blue resist blocks 23 have thicknesses that are smaller than a thickness of portions of the covering layer 8 that correspond to the green resist blocks 22.

Preferably, the gap distance c1 between the site of the color filter substrate 100 where the red resist blocks 21 are arranged and the array substrate 200 and the gap distance c2 between the site of the color filter substrate 100 where the blue resist blocks 23 are arranged and the array substrate 200 are both 3.2 µm, and the gap distance c3 between the site of the color filter substrate 100 where the green resist blocks 22 are located and the array substrate 200 is 3 µm.

Specifically, the covering layer 8 is form of a material that comprises an organic substance.

In the liquid crystal display panels illustrated in FIGS. 5 and 6, the gap distance c3 between the site of the color filter substrate 100 where the green resist blocks 22 are arranged and the array substrate 200 is made relatively small and the gap distance c1 between the site of the color filter substrate 100 where the red resist blocks 21 are arranged and the array substrate 200 and the gap distance c2 between the site of the color filter substrate 100 where the blue resist blocks 23 are arranged and the array substrate 200 are made relatively large thereby reducing the amount of background light that corresponds to red and blue sub-pixels being diffused into the green sub-pixel and reducing the amount of green light mixed with peripheral portions of red and blue images and thus improving the problem of large view angel color shifting of the liquid crystal display panel and enhancing quality of displaying.

In summary, the present invention provides a liquid crystal display panel, in which the spacing distance of the pixel electrodes that correspond to the green resist blocks from the pixel electrodes corresponding to red and blue resist blocks adjacent thereto is made greater than the spacing distance between the pixel electrodes corresponding to the red resist blocks and the pixel electrodes corresponding to the blue resist blocks, this being equivalent to expanding the distance between a green sub-pixel of the liquid crystal display panel and a blue sub-pixel and a red sub-pixel adjacent thereto, thereby reducing the possibility of the background light corresponding to the red and blue sub-pixels being diffused into the green sub-pixel and reducing the amount of green light mixed with peripheral portions of red and blue images and thus improving the issue of large view angle color shifting of the liquid crystal display panel; and also, cell thickness of the liquid crystal display panel corresponding to the green resist blocks is reduced so as to further reduce the amount of the background light corresponding to the red and blue sub-pixels being diffused into the green sub-pixel and reduce the amount of green light mixed with the peripheral portions of the red and blue images and thus improving the problem of large view angel color shifting of the liquid crystal display panel and enhancing quality of displaying.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display panel, comprising: a color filter substrate (100) and an array substrate (200) that are arranged opposite to each other and a liquid crystal layer interposed between the color filter substrate (100) and the array substrate (200);

the color filter substrate (100) comprising a first backing plate (1) and a color resist layer (2) and a black matrix (3) arranged on the first backing plate (1), the color resist layer (2) comprising a plurality of color resist blocks (20) that is arranged in an array, wherein the plurality of color resist blocks (20) comprises red resist blocks (21), green resist blocks (22), and blue resist blocks (23), the black matrix (3) comprising a plurality of black light-shielding strips (30) respectively located in spacing zones between the plurality of color resist blocks (20);

the array substrate (200) comprises a second backing plate (7), a thin-film transistor (TFT) layer (6) arranged on the second backing plate (7), and a pixel electrode layer (4) arranged on the TFT layer (6), the pixel electrode layer (4) comprising a plurality of pixel electrodes (40) corresponding respectively to the plurality of color resist blocks (20), the plurality of pixel electrodes (40) comprising first pixel electrodes (41) corresponding to the red resist blocks (21), second pixel electrodes (42) corresponding to the green resist blocks (22), and third pixel electrodes (43) corresponding to the blue resist blocks (23);

wherein a spacing distance (b1) between the second pixel electrodes (42) that correspond to the green resist blocks (22) and the first pixel electrodes (41) that correspond to the red resist blocks (21) and a spacing distance (b2) between the second pixel electrodes (42) that correspond to the green resist blocks (22) and the third pixel electrodes (43) that correspond to the blue resist blocks (23) are both greater than a spacing distance (b3) between the first pixel electrodes (41) that correspond to the red resist blocks (21) and the third pixel electrodes (43) that correspond to the blue resist blocks (23).

2. The liquid crystal display panel as claimed in claim 1, wherein the spacing distance (b1) between the second pixel electrodes (42) that correspond to the green resist blocks (22) and the first pixel electrodes (41) that correspond to the red resist blocks (21) and the spacing distance (b2) between the second pixel electrodes (42) that correspond to the green resist blocks (22) and the third pixel electrodes (43) that correspond to the blue resist blocks (23) are both 12 µm; and the spacing distance (b3) between the first pixel electrodes (41) that correspond to the red resist blocks (21) and the third pixel electrodes (43) that correspond to the blue resist blocks (23) is 10 µm.

3. The liquid crystal display panel as claimed in claim 1, wherein the plurality of black light-shielding strips (30) that forms the black matrix (3) has identical widths.

4. The liquid crystal display panel as claimed in claim 3, wherein the widths of the black light-shielding strips (30) are 5 µm.

5. The liquid crystal display panel as claimed in claim 1, wherein the color filter substrate (100) further comprises a covering layer (8) arranged on the color resist layer (2) and the black matrix (3).

6. The liquid crystal display panel as claimed in claim 5, wherein a gap distance (c1) between a site of the color filter substrate (100) where the red resist blocks (21) are arranged and the array substrate (200) and a gap distance (c2) between a site of the color filter substrate (100) where the blue resist blocks (23) are arranged and the array substrate (200) are both greater than a gap distance (c3) between a site of the color filter substrate (100) where the green resist blocks (22) are arranged and the array substrate (200).

7. The liquid crystal display panel as claimed in claim 6, wherein the blue resist blocks (23) and the red resist blocks (21) have thicknesses that are less than a thickness of the green resist blocks (22) and portions of the covering layer (8) corresponding to the red resist blocks (21), the green resist blocks (22), and the blue resist blocks (23) have thicknesses that are identical.

8. The liquid crystal display panel as claimed in claim 6, wherein the red resist blocks (21), the green resist blocks (22), and the blue resist blocks (23) have thicknesses that are identical and portions of the covering layer (8) corresponding to the red resist blocks (21) and the blue resist blocks (23) have thicknesses that are less than a thickness of portions of the covering layer (8) that correspond to the green resist blocks (22).

9. The liquid crystal display panel as claimed in claim 6, wherein the gap distance (c1) between the site of the color filter substrate (100) where the red resist blocks (21) are arranged and the array substrate (200) and the gap distance (c2) between the site of the color filter substrate (100) where the blue resist blocks (23) are arranged and the array substrate (200) are both 3.2 µm, and the gap distance (c3) between the site of the color filter substrate (100) where the green resist blocks (22) are arranged and the array substrate (200) is 3 µm.

10. The liquid crystal display panel as claimed in claim 1, wherein the pixel electrode layer (4) is formed of a material comprising indium tin oxide and metal lines are arranged in spacing zones between the first pixel electrodes (41), the second pixel electrodes (42), and the third pixel electrodes (43); a thickness of the metal lines arranged between the second pixel electrodes (42) and the first pixel electrodes (41) and a thickness of the metal line arranged between the second pixel electrodes (42) and the third pixel electrodes (43) are both greater than a thickness of the metal lines arranged between the first pixel electrodes (41) and the third pixel electrodes (43).

* * * * *